(12) United States Patent
Suzuki

(10) Patent No.: US 8,693,038 B2
(45) Date of Patent: Apr. 8, 2014

(54) WIRELESS COMMUNICATION DEVICE CAPABLE OF OPERATING SELECTIVELY IN ANY STATE AMONG A PLURALITY OF STATES INCLUDING A PARENT STATE AND A CHILD STATE IN A WIRELESS NETWORK

(75) Inventor: Takanobu Suzuki, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 178 days.

(21) Appl. No.: 13/429,613

(22) Filed: Mar. 26, 2012

(65) Prior Publication Data

US 2012/0322391 A1    Dec. 20, 2012

(30) Foreign Application Priority Data

Jun. 14, 2011  (JP) ................................. 2011-132285

(51) Int. Cl.
*G06F 3/12*    (2006.01)
*H04B 1/00*    (2006.01)

(52) U.S. Cl.
USPC .......................................... 358/1.15; 455/68

(58) Field of Classification Search
USPC .......... 358/1.1, 1.9, 1.13, 1.15, 402; 709/208, 709/229; 370/254, 315, 336; 455/68
See application file for complete search history.

(56) References Cited

U.S. PATENT DOCUMENTS

| 2009/0092060 | A1* | 4/2009 | Goto | 370/254 |
| 2009/0240781 | A1* | 9/2009 | Otsuka | 709/208 |
| 2010/0260069 | A1* | 10/2010 | Sakamoto et al. | 370/254 |
| 2010/0303001 | A1* | 12/2010 | Tamura et al. | 370/315 |
| 2011/0075589 | A1* | 3/2011 | Bradley et al. | 370/254 |
| 2012/0259992 | A1* | 10/2012 | Koehler et al. | 709/229 |

FOREIGN PATENT DOCUMENTS

| JP | 2001-175602 A | 6/2001 |
| JP | 2004-234286 A | 8/2004 |
| JP | 2006-191403 A | 7/2006 |

* cited by examiner

*Primary Examiner* — Gabriel Garcia
(74) *Attorney, Agent, or Firm* — Baker Botts L.L.P.

(57) ABSTRACT

In a case where a first wireless network is to be constructed, and it is determined that a wireless communication device is to operate in a parent state, the wireless communication device may create first authentication information, and construct the first wireless network by executing a communication for establishing a wireless connection with a first external device by using a first wireless profile including the first authentication information. In a case where a second wireless network is to be constructed after the first wireless network has disappeared, and it is determined that the wireless communication device is to operate in the parent state, the wireless communication device may create second authentication information, and construct the second wireless network by executing a communication for establishing a wireless connection with a second external device by using a second wireless profile including the second authentication information.

9 Claims, 8 Drawing Sheets

WIRELESS COMMUNICATION DEVICE CAPABLE OF OPERATING SELECTIVELY IN ANY STATE AMONG A PLURALITY OF STATES INCLUDING A PARENT STATE AND A CHILD STATE IN A WIRELESS NETWORK

CROSS-REFERENCE TO RELATED APPLICATIONS

This application claims priority to Japanese Patent Application No. 2011-132285, filed on Jun. 14, 2011, the contents of which are hereby incorporated by reference into the present application.

TECHNICAL FIELD

A technique disclosed in the present specification relates to a wireless communication device capable of operating selectively in any state among a plurality of states including a parent state performing as a parent station of a wireless network and a child state performing as a child station of the wireless network.

DESCRIPTION OF THE RELATED ART

Conventionally, a technique for constructing a wireless network including a client device and an access point is known. In this technique, when a predetermined operation is performed by a user, the client device creates a wireless profile (an SSID, a password, etc) to be used for constructing the wireless network. The client device and the access point establish a wireless connection using the wireless profile. Thereby, the wireless network is constructed.

SUMMARY

Nothing is disclosed in the conventional technique concerning a situation where, after the wireless network has disappeared, a new wireless network is constructed. In the present specification, a technique is disclosed for appropriately constructing a new wireless network in the situation where a new wireless network is constructed after the wireless network has disappeared.

One technique disclosed in the present application is a wireless communication device. The wireless communication device may be configured to be capable of operating selectively in any state among a plurality of states including a parent state performing as a parent station of a wireless network and a child state performing as a child station of the wireless network. The wireless communication device may comprise one or more processors, and a memory that stores a computer program including instructions executed by the one or more processors. The instructions may cause the one or more processors, when executed by the one or more processors, to function as a determination unit, a creating unit, and a communication executing unit. The determination unit may be configured to determine a state among the plurality of states in which the wireless communication device is to operate. The creating unit may be configured to create first authentication information included in a first wireless profile for constructing a first wireless network in a case where the first wireless network including the wireless communication device and a first external device is to be constructed, and it is determined that the wireless communication device is to operate in the parent state. The communication executing unit may be configured to construct the first wireless network by executing a communication for establishing a wireless connection with the first external device by using the first wireless profile including the first authentication information. In a case where a second wireless network including the wireless communication device and a second external device is to be constructed after the first wireless network has disappeared, and it is determined that the wireless communication device is to operate in the parent state, the creating unit may be further configured to create second authentication information included in a second wireless profile for constructing the second wireless network, the second authentication information being different from the first authentication information. The communication executing unit may be further configured to construct the second wireless network by executing a communication for establishing a wireless connection with the second external device by using the second wireless profile including the second authentication information.

Moreover, a method for realizing the wireless communication device is also novel and useful. In addition, a computer program for realizing the wireless communication device and a non-transitory computer readable storage medium that stores the computer program are also novel and useful.

BRIEF DESCRIPTION OF THE DRAWINGS

EMBODIMENT (Embodiments)
(Configuration of System: FIG. 1)

As shown in FIG. 1, a communication system 2 comprises a printer 10 (a peripheral of PCs 60 and 70), and the PCs 60, 70. The printer 10 and the PC 60 are each capable of executing a wireless communication function in accordance with Wi-Fi Direct (to be described). Moreover, below, Wi-Fi Direct is called "WFD", and the wireless communication function in accordance with Wi-Fi Direct is called a "WFD function". The printer 10 and the PC 60 are capable of establishing a wireless connection in accordance with WFD. A wireless network is constructed by establishing the wireless connection between the printer 10 and the PC 60. Thereby, the printer 10 and the PC 60 become capable of wirelessly communicating object data of a communication object such as printing data, etc. Below, an apparatus capable of executing the WFD function, such as the printer 10 and the PC 60, is called a "WFD compliant apparatus".

Figure 1:
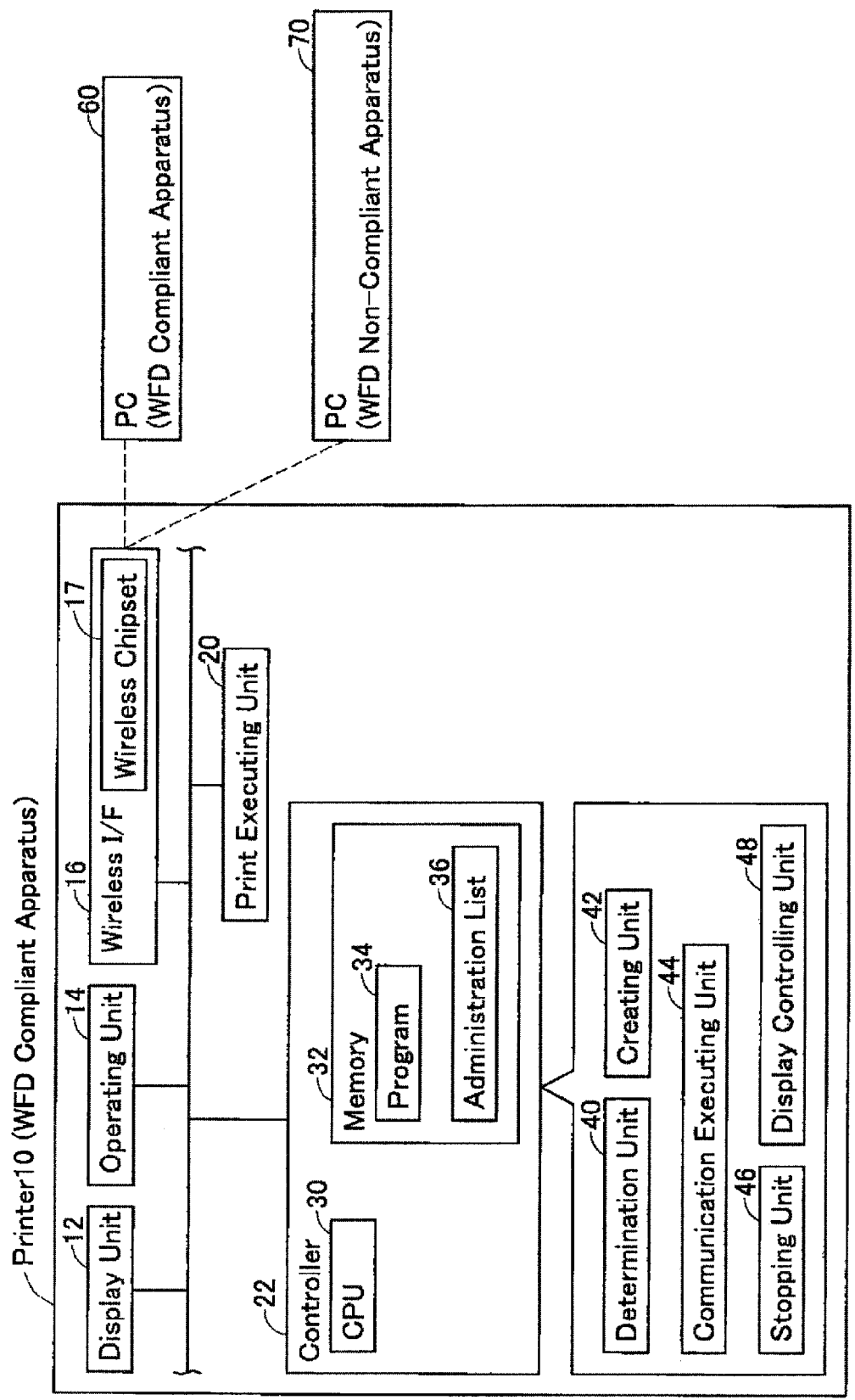
FIG. 1 shows an example of the configuration of a communication system.

The PC 70 is not capable of executing the WFD function, but is capable of executing normal wireless communication. That is, the PC 70 is capable of establishing a known wireless connection with an AP (access point). As will be described in detail below, a wireless network is constructed by establishing a wireless connection between the PC 70 and the printer 10 that is in a G/O state which functions as an AP. Thereby, the printer 10 and the PC 70 become capable of wirelessly communicating object data of a communication object such as printing data, etc. Below, an apparatus that is not capable of executing the WFD function, such as the PC 70, is called a "WFD non-compliant apparatus".

(Configuration of Printer 10)

The printer 10 comprises a display unit 12, an operating unit 14, a wireless interface 16, a print executing unit 20, and a controller 22. The units 12 to 22 are connected with a bus line (reference number omitted). The display unit 12 is a display for displaying various information. The operating unit 14 consists of a plurality of keys. A user can give various instructions to the printer 10 by operating the operating unit 14. The wireless interface 16 is an interface for performing wireless communication. The wireless interface 16 includes a wireless chipset 17. The function of the wireless chipset 17 will be described later. The print executing unit 20 comprises a printing mechanism such as an ink jet method, laser method, etc. printing mechanism, and executes printing according to an instruction from the controller 22.

The controller 22 comprises a CPU 30 and a memory 32. The CPU 30 executes various processes according to a program 34 stored in the memory 32. The memory 32 consists of a ROM, RAM, hard disk, etc. In addition to the program 34, the memory 32 stores an administration list 36 (to be described). The CPU 30 realizes the functions of a determination unit 40, a creating unit 42, a communication executing unit 44, a stopping unit 46, and a display controlling unit 48 by executing processes according to the program 34.

(Configuration of PCs 60, 70)

The PC 60 comprises a CPU, memory, display, etc. (not shown). The memory of the PC 60 stores a printer driver program for the printer 10. The CPU of the PC 60 can create printing data of a printing object by using the printer driver program. In a state where a wireless connection has been established between the printer 10 and the PC 60, the PC 60 can wirelessly send the printing data to the printer 10. Moreover, except for being unable to perform the WED function, the PC 70 has the same configuration as the PC 60.

(WFD)

As described above, the printer 10 and the PC 60 are each capable of executing the WED function. WFD is a standard formulated by Wi-Fi Alliance. WFD is described in "Wi-Fi Peer-to-Peer (P2P) Technical Specification Version 1.1" created by Wi-Fi Alliance.

In WFD, three states have been defined as the states of the apparatus: Group Owner state (called "G/O state" below), client state, and device state. A WFD compliant apparatus (i.e., the printer 10, the PC 60, etc.) is capable of selectively operating in one state among the three states. Moreover, a WFD non-compliant apparatus is not capable of selectively operating in one state among the three states, but always operates in the client state.

One wireless network consists of an apparatus in the G/O state and an apparatus in the client state. There can be only one G/O state apparatus present in one wireless network, but one or more client state apparatuses can be present. The G/O state apparatus administrates the one or more client state apparatuses. Specifically, the G/O state apparatus stores an administration list (see 36 of FIG. 1) in which identification information (i.e., MAC address) of each of the one or more client state apparatuses is written. When a client state apparatus (including either a WFD compliant apparatus or a WFD non-compliant apparatus) newly participates in a wireless network, the G/O state apparatus adds the identification information of that apparatus to the administration list, and when the client state apparatus leaves the wireless network, the G/O state apparatus deletes the identification information of that apparatus from the administration list.

The G/O state apparatus is capable of wirelessly communicating object data of a communication object (e.g., data that includes information of the network layer of the OSI reference model (printing data, etc.)) with an apparatus registered in the administration list, i.e., with an apparatus in the client state. However, with an apparatus not registered in the administration list, the G/O state apparatus is capable of wirelessly communicating data for participating in the wireless network (e.g., data that does not include network layer information (physical layer data such as a Probe Request signal, Probe Response signal, etc.)) but is not capable of wirelessly communicating the object data. For example, the printer 10 that is in the G/O state is capable of wirelessly receiving printing data from the PC 60 that is registered in the administration list 36 (i.e., the PC 60 that is in the client state), but is not capable of wirelessly receiving printing data from a PC that is not registered in the administration list 36.

Further, the G/O state apparatus is capable of relaying the wireless communication of object data (printing data, etc.) between a plurality of client state apparatuses. For example, in a case where the PC 60 that is in the client state should wirelessly send printing data to another printer that is in the client state, the PC 60 first wirelessly sends the printing data to the printer 10 that is in the G/O state, and the printer 10 wirelessly sends the printing data to the other printer. That is, the G/O state apparatus is capable of executing the function of an AP (access point) of a wireless network.

Moreover, a WFD compliant apparatus that is not participating in the wireless network (i.e., a WFD compliant apparatus not registered in the administration list) is a device state apparatus. The device state apparatus is capable of wirelessly communicating data for participating in the wireless network, but is not capable of wirelessly communicating object data (printing data, etc.) via the wireless network.

(Mode for Executing Wireless Connection)

In the present embodiment, a WPS (Wi-Fi Protected Setup) wireless connection mode and a manual wireless connection mode (called "manual mode" below) are used as the modes for executing a wireless connection between a pair of apparatuses. Moreover, the WPS wireless connection mode is used in WFD. The WPS wireless connection mode includes a PIN (Personal Identification Number) code mode and a PBC (Push Button Configuration) mode. On the other hand, the manual mode is a mode for executing a wireless connection between a WFD non-compliant apparatus (e.g., the PC 70) and an AP (e.g., the printer 10 that is in the G/O state) not by using the WPS wireless connection mode, but by the user inputting a wireless profile (an SSID, an authentication mode, an encryption mode, a password, etc.) needed to establish the wireless connection.

(Autonomic G/O Mode)

The WFD compliant apparatus (the printer 10, the PC 60, etc.) of the present embodiment operates according to either a normal operation mode or an autonomic G/O mode, this being different from the normal operation mode. The user can execute a predetermined operation (to be described, see S10 of FIG. 2) in an operating unit of the WFD compliant apparatus to switch the autonomic G/O mode ON or OFF.

Figure 2:
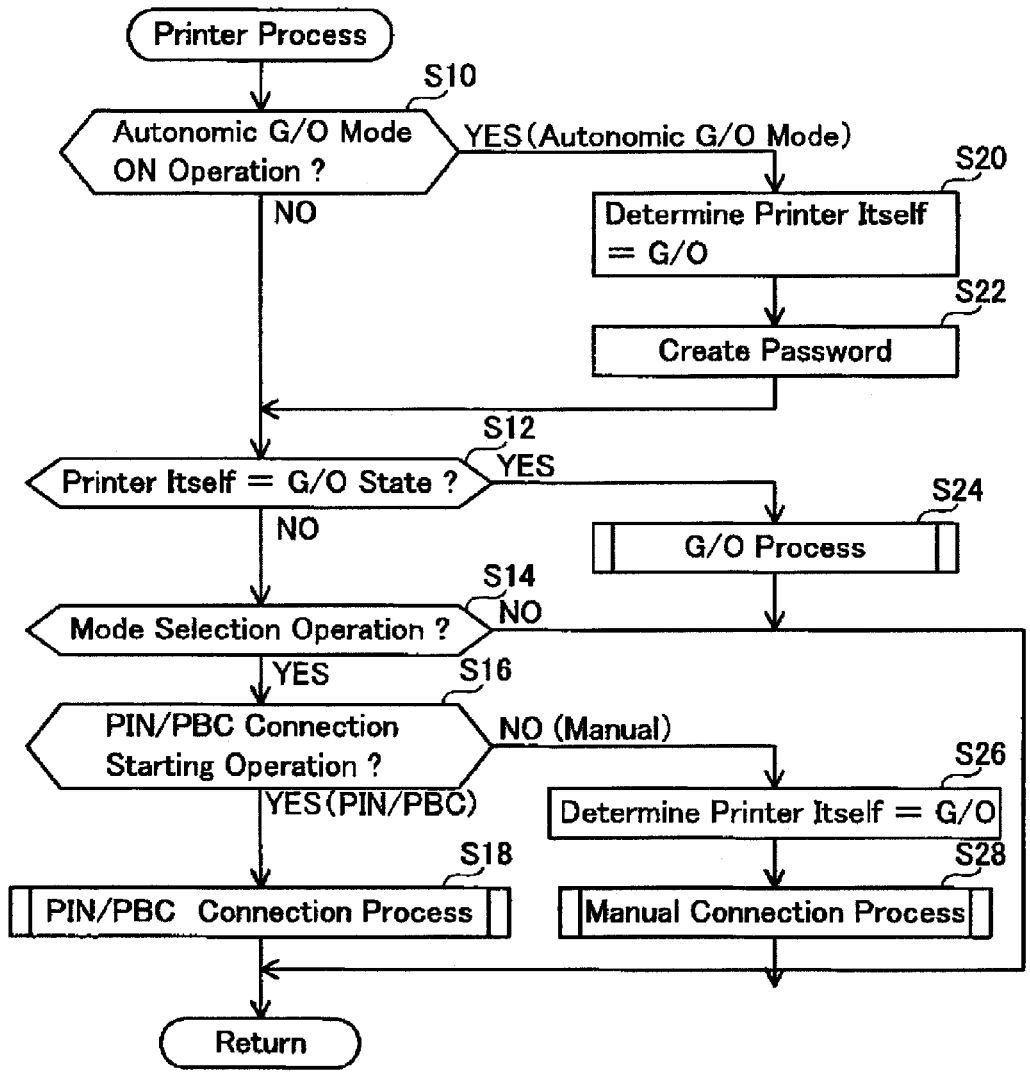
FIG. 2 shows a flowchart of a printer process.

(Printer Process: FIG. 2)

Next, the contents of a printer process executed by the printer 10 that is in the device state will be described with reference to FIG. 2.

While a power supply of the printer 10 is in an ON state, in S10 the controller 22 of the printer 10 monitors whether ON operation of the autonomic G/O mode has been executed. In a case of YES in S10 (in a case where the user has executed the ON operation of the autonomic G/O mode), the controller 22 proceeds to S20. In S20, the determination unit 40 (see FIG. 1) determines the state of the printer 10 as the G/O state, and transfers the state of the printer 10 from the current state (e.g., the device state) to the G/O state. Moreover, in a case of NO in S10 (in a case where the user has not executed ON operation of the autonomous G/O mode), the controller 22 proceeds to S12.

Next, in S22, the creating unit 42 (see FIG. 1) creates a password. The password created in S22 is a password to be included in a wireless profile used for constructing the wireless network. Specifically, the creating unit 42 creates the password by creating a character string using alphanumeric characters in a random manner and by converting the created character string using a predetermined function related to the current time. Creating the password using the above method makes it less likely for regularity to appear in the password. That is, each time the creating unit 42 creates a password, it creates a password that differs from the password created the last time. When S22 ends, the controller 22 proceeds to S12.

In S12, the controller 22 determines whether the current state of the printer 10 is the G/O state. In a case of YES in S12 (in a case where current state of the printer 10=G/O state), the controller 22 proceeds to S24. In S24, the controller 22 executes the G/O process (see FIG. 5). When the G/O process of S24 ends, the controller 22 returns to S10.

In a case of NO in S12 (in a case where the current state of the printer 10=device state or client state), the controller 22 proceeds to S14. In S14, the controller 22 monitors whether a mode selection operation has been executed. By operating the operating unit 14 of the printer 10, the user can execute the mode selection operation for selecting one mode from among the PIN code mode, the PBC mode, and the manual mode. When the user executes the mode selection operation, the controller 22 determines YES in S14, and proceeds to S16. Moreover, in a case of NO in S14 (in a case where the user does not execute the mode selection operation), the controller 22 returns to S10.

In S16, the controller 22 determines whether the mode selected in S14 is the PIN code mode or the PBC mode. In a case of YES in S16 (the mode selected in S14=PIN code mode or PBC mode), the controller 22 proceeds to S18. In S18, the controller 22 executes a PIN/PBC connection process (see FIG. 3). On the other hand, in a case of NO in S16 (the mode selected in S14=manual mode), the controller 22 proceeds to S26. In S26, the determination unit 40 determines the state of the printer 10 as the G/O state, and transfers the state of the printer 10 from the current state (e.g., the device state) to the G/O state. Next, in S28, the controller 22 executes a manual connection process (see FIG. 4). When S18 or S28 ends, the controller 22 returns to S10.

Moreover, in a case where YES is determined in S16 (the mode selected in S14=PIN code mode or PBC mode) while the current state of the printer 10 is the device state, the determination unit 40 maintains the device state as the state of the printer 10, and the controller 22 proceeds to S18. On the other hand, in the case where YES is determined in S16 (the mode selected in S14=PIN code mode or PBC mode) while the current state of the printer 10 is the client state, the determination unit 40 determines the device state as the state of the printer 10 and, after the state of the printer 10 has been transferred from the client state to the device state, the controller 22 proceeds to S18.

Figure 3:
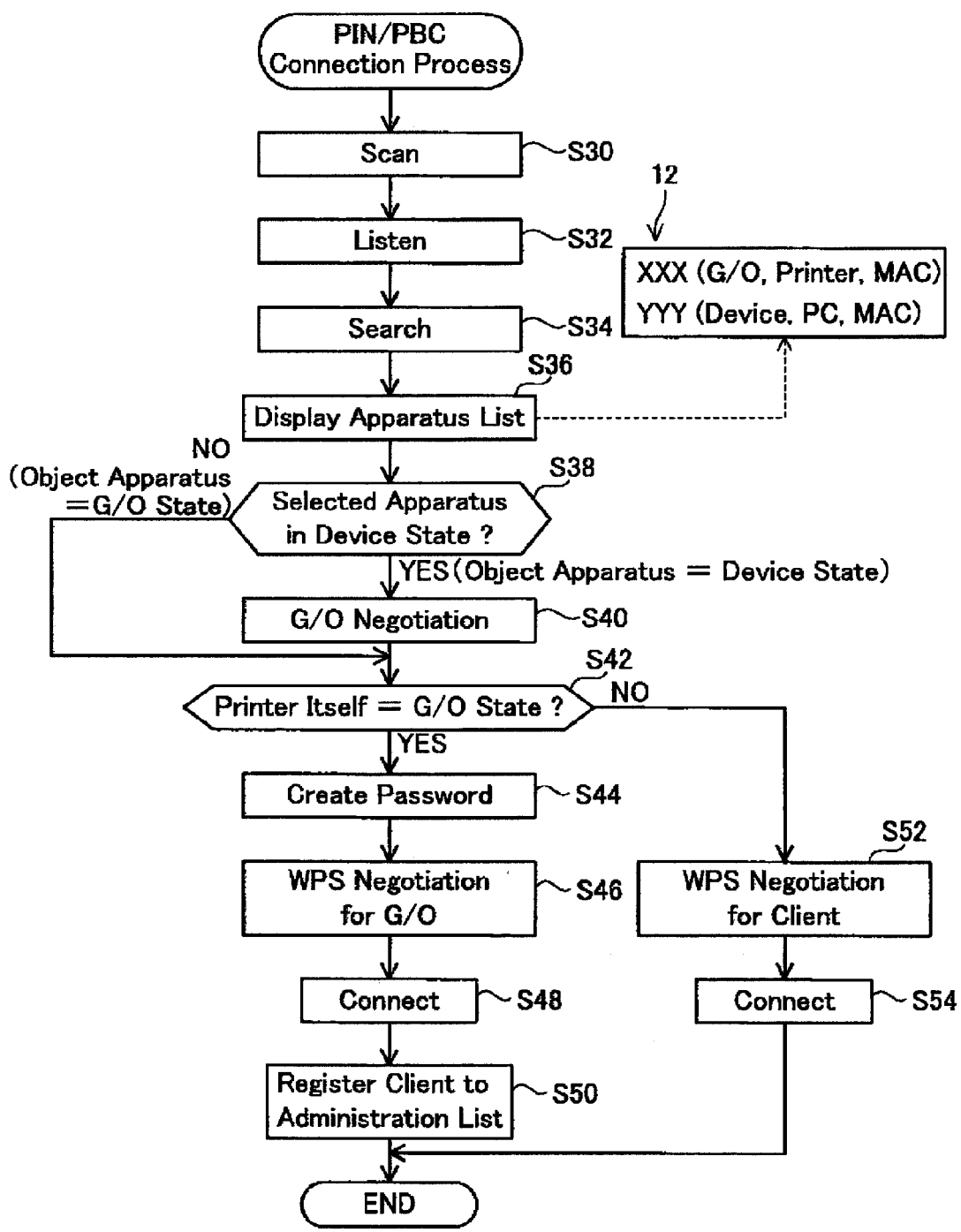
FIG. 3 shows a flowchart of a PIN/PBC connection process.

(PIN/PBC Connection Process: FIG. 3)

Next, the contents of the PIN/PBC connection process executed by the printer 10 that is in the device state will be described with reference to FIG. 3. The PIN/PBC connection process is a process for establishing a wireless connection between the printer 10 and another WFD compliant apparatus (e.g., the PC 60) by means of either mode from among the PIN code mode and the PBC mode.

In S30 of FIG. 3, the controller 22 of the printer 10 executes a Scan process. The Scan process is a process for searching for a G/O state apparatus (a WFD compliant apparatus) present in the surroundings of the printer 10. Specifically, in the Scan process, the controller 22 sequentially uses thirteen channels 1ch to 13ch to sequentially send a Probe Request signal wirelessly.

For example, in a case where a WFD compliant apparatus that is in the G/O state (called "specific G/O apparatus" below) is present in the surroundings of the printer 10, it has been determined in advance that the specific G/O apparatus uses one channel from among 1ch to 13ch. Consequently, the specific G/O apparatus wirelessly receives the Probe Request signal from the printer 10. In this case, the specific G/O apparatus wirelessly sends a Probe Response signal to the printer 10. This Probe Response signal includes information indicating that the specific G/O apparatus is in the G/O state. Consequently, the controller 22 can find the specific G/O apparatus. Moreover, the Probe Response signal further includes information indicating a device name of the specific G/O apparatus and a category (e.g., printer, PC, etc.) of the specific G/O apparatus, and a MAC address of the specific G/O apparatus. Consequently, the controller 22 can acquire information relating to the specific G/O apparatus.

Moreover, for example, in a case where a WFD compliant apparatus that is in the device state (called "specific device apparatus" below) is present in the surroundings of the printer 10, it has been determined in advance that the specific device apparatus uses one channel from among 1ch, 6ch, 11ch. Consequently, the specific device apparatus also wirelessly receives a Probe Request signal from the printer 10. In this case, the specific device apparatus wirelessly sends a Probe Response signal to the printer 10. However, this Probe Response signal includes information indicating that the apparatus is in the device state, and does not include information indicating that the apparatus is in the G/O state. Further, even if an apparatus that is in the client state (including a WFD non-compliant apparatus) wirelessly receives a Probe Request signal from the printer 10, the apparatus that is in the client state does not wirelessly send a Probe Response signal to the printer 10. Consequently, in the Scan process, the controller 22 can appropriately find the specific G/O apparatus.

Next, in S32, the controller 22 executes a Listen process. The Listen process is a process for responding to the Probe Request signal wirelessly received from the specific device apparatus which is executing a Search process (to be described: see S34). That is, upon wirelessly receiving the Probe Request signal from the specific device apparatus, the controller 22 wirelessly sends a Probe Response signal. This Probe Response signal includes information indicating that the printer 10 is in the device state, information indicating the device name and the category of the printer 10, and a MAC address of the printer 10. The specific device apparatus can find the printer 10 by means of the controller 22 sending the Probe Response signal.

Next, in S34, the controller 22 sequentially uses the three channels 1ch, 6ch, 11ch so as to sequentially send a Probe Request signal wirelessly. Thereby, the controller 22 wirelessly receives a Probe Response signal from the specific device apparatus. This Probe Response signal includes information indicating that the specific device apparatus is in the device state, information indicating the device name and the category of the specific device apparatus, and a MAC address of the specific device apparatus. Thereby, the controller 22 can find the specific device apparatus, and can acquire information relating to the specific device apparatus. Moreover, the specific G/O apparatus, also, can wirelessly send a Probe Response signal to the printer 10 in response to the Probe Request signal sent in the Search process of the printer 10. However, this Probe Response signal includes information indicating that the apparatus is in the G/O state, and does not include information indicating that the apparatus is in the device state. Further, as described above, even if an apparatus that is in the client state (including a WFD non-compliant apparatus) wirelessly receives a Probe Request signal from the printer 10, the apparatus that is in the client state does not wirelessly send a Probe Response signal to the printer 10. Consequently, in the Search process, the controller 22 can appropriately find the specific device apparatus.

Next, in S36, the controller 22 causes the display unit 12 to display an apparatus list. The controller 22 causes the display unit 12 to display information relating to the apparatuses found in S30 and S34 (i.e., the information acquired in S30 and S34). In the example of FIG. 3, in S36, information (G/O state, printer, MAC address) relating to an apparatus corresponding to a device name "XXX", and information (device state, PC, MAC address) relating to an apparatus corresponding to a device name "YYY" is displayed in the display unit 12.

The user can learn the apparatuses present in the surroundings of the printer 10 by looking at the apparatus list displayed in S36. The user can execute an apparatus selection operation in the operating unit 14 to select which apparatus should establish a wireless connection with the printer 10. Moreover, below, an apparatus (e.g., the PC 60) selected by means of the apparatus selection operation is called an "object apparatus". When the object apparatus has been selected, the controller 22 proceeds to S38.

In S38, the controller 22 determines whether the object apparatus is in the device state. In a case where the object apparatus is in the device state (e.g., in a case where the apparatus corresponding to the device name "YYY" of FIG. 3 has been selected by the user), the controller 22 determines YES in S38, and proceeds to S40.

In S40, the determination unit 40 (see FIG. 1) executes a G/O negotiation with the object apparatus. As described above, only one G/O state apparatus can be present in one wireless network. Consequently, the determination unit 40 executes the G/O negotiation, determining one apparatus from among the printer 10 and the object apparatus as the G/O, and determining the other apparatus as the client.

For example, in the case where the mode selected in S14 of FIG. 2 is the PIN code mode, in S40 the determination unit 40 creates a PIN code and displays this PIN code in the display unit 12. In this case, the user inputs the PIN code displayed in the display unit 12 into the object apparatus. Moreover, here, an example has been described where the PIN code is displayed in the printer 10, and the PIN code is input into the object apparatus. However, the PIN code may be displayed in the object apparatus, and input into the printer 10. When the display and input of the PIN code have been executed, the determination unit 40 wirelessly sends a connection request signal to the object apparatus, and wirelessly receives an G/O signal from the object apparatus.

On the other hand, for example, in the case where the mode selected in S14 of FIG. 2 is the PBC mode, the display and input of the PIN code are not executed. In this case, the determination unit 40 wirelessly sends a connection request signal to the object apparatus, and wirelessly receives an OK signal from the object apparatus.

Upon completing the sending of the connection request signal and the reception of the OK signal, the determination unit 40 wirelessly sends information indicating G/O priority of the printer 10 to the object apparatus, and wirelessly receives information indicating G/O priority of the object apparatus from the object apparatus. Moreover, the G/O priority of the printer 10 is an index indicating the priority with which the printer 10 should become the G/O, and is predetermined in the printer 10. Similarly, the G/O priority of the object apparatus is an index indicating the priority with which the object apparatus should become the G/O. For example, an apparatus (e.g., a PC) in which CPU and memory capacity are comparatively high can execute other processes rapidly while operating as a G/O. Consequently, in this type of apparatus, the G/O priority is usually set such that the priority of becoming G/O is high. On the other hand, for example, an apparatus in which CPU and memory capacity are comparatively low might not be able to execute other processes rapidly while operating as a G/O. Consequently, in this type of apparatus, the G/O priority is usually set such that the priority of becoming G/O is low.

The determination unit 40 compares the G/O priority of the printer 10 and the G/O priority of the object apparatus, determines the apparatus (the printer 10 or the object apparatus) with the higher priority as the G/O, and determines the apparatus (the object apparatus or the printer 10) with the lower priority as the client. Further, the object apparatus determines the G/O and the client based on the G/O priority of the printer 10 and the G/O priority of the object apparatus by using the same method as the printer 10.

Upon ending the G/O negotiation of S40, the determination unit 40 transfers the state of the printer 10 from the device state to the determined state (i.e., the client state or the G/O state). Further, the object apparatus is also transferred from the device state to the determined state (i.e., the client state or the G/O state).

On the other hand, in a case where the object apparatus is in the G/O state in S38 (e.g., in a case where the apparatus corresponding to the device name "XXX" of FIG. 3 has been selected by the user), the controller 22 determines NO in S38, skips S40, and proceeds to S42. In this case, the determination unit 40 determines the client state as the state of the printer 10 without executing the G/O negotiation of S40, and transfers the state of the printer 10 from the device state to the client state. This is because, since the object apparatus is in the G/O state, the printer 10 preferably assumes the client state that is administrated by the object apparatus.

For example, in the case where the mode selected in S14 of FIG. 2 is the PIN code mode, when it is determined NO in S38 and, as in S40, the display and input of the PIN code is executed. Next, the determination unit 40 wirelessly receives a connection request signal from the object apparatus, and wirelessly sends an OK signal to the object apparatus. On the other hand, for example, in the case where the mode selected in S14 of FIG. 2 is the PBC mode, when it is determined NO in S38 and, without the display and input of the PIN code being executed, the determination unit 40 wirelessly receives a connection request signal from the object apparatus, and wirelessly sends an OK signal to the object apparatus. When the reception of the connection request signal and the sending of the OK signal has been executed, the controller 22 proceeds to S42.

In S42, the controller 22 determines whether the current state of the printer 10 is the G/O state. In the case of YES in S42 (the current state of the printer 10=G/O state, and the current state of the object apparatus=client state), the controller 22 proceeds to S44. On the other hand, in the case of NO in S42 (the current state of the printer 10=client state, and the current state of the object apparatus=G/O state), the controller 22 proceeds to S52.

In S44, the creating unit 42 (see FIG. 1) creates a password. The process S44 is the same as process S22 of FIG. 2. When S44 ends, the controller 22 proceeds to S46.

In S46, the communication executing unit 44 (see FIG. 1) executes WPS negotiation for the G/O state. For example, in the case where the mode selected in S14 of FIG. 2 is the PIN code mode, the communication executing unit 44 converts specific data (e.g., packet data communicated last between the printer 10 and the object apparatus) into a hash code by using the PIN code displayed in the printer 10 or the PIN code input into the printer 10. The object apparatus, also, converts the specific data into a hash code by using the PIN code displayed in the object apparatus or the PIN code input into the object apparatus. Either the printer 10 (the communication executing unit 44) or the object apparatus determines whether the hash code created by the printer 10 and the hash code created by the object apparatus are matching. Further, for example, in the case where the mode selected in S14 of FIG. 2 is the PBC mode, the printer 10 (the communication executing unit 44) and the object apparatus convert the specific data into a hash code by using a predetermined PIN code. Further, either the printer 10 or the object apparatus determines whether the two hash codes are matching. In the present embodiment, the SSID, the authentication mode and the encryption mode have been predetermined. However, the SSID may be created in S46. Further, the password is created in S44.

In a case where the two hash codes are matching, i.e., in a case where authentication of the PIN code succeeded, the communication executing unit 44 wirelessly sends the wireless profile to the object apparatus. Consequently, the printer 10 and the object apparatus can use the same wireless profile.

Next, in S48, the communication executing unit 44 executes a connection process with the object apparatus using the wireless profile. That is, the communication executing unit 44 wirelessly communicates an Authentication Request, an Authentication Response, an Association Request, an Association Response, and a 4way handshake with the object apparatus by using the wireless profile. During this process, the printer 10 and the object apparatus execute various authentication processes such as SSID authentication, password authentication, authentication mode and encryption mode authentication, etc. In a case where all the authentications succeed, a wireless connection is established between the printer 10 and the object apparatus. Thereby, a wireless network that includes the printer 10 and the object apparatus is constructed.

Next, in S50, the controller 22 registers the MAC address of the object apparatus, which is in the client state, in the administration list 36 within the memory 32. Moreover, the MAC address of the object apparatus is included in the Probe Response signal acquired in the Search process of S34. When S50 ends, the PIN/PBC connection process ends.

On the other hand, in S52 the communication executing unit 44 executes WPS negotiation for the client state. Specifically, in S52 the communication executing unit 44 wirelessly receives a wireless profile (an SSID, an authentication mode, an encryption mode, an password, etc.), which is needed to establish a wireless connection, from the object apparatus. For example, in the case where the mode selected in S14 of FIG. 2 is the PIN code mode, the printer 10 (the communication executing unit 44) and the object apparatus convert the specific data into a bash code using the PIN code displayed in the printer 10 or the PIN code input into the printer 10, and determine whether the two hash codes are matching. In a case where the two hash codes are matching, the communication executing unit 44 wirelessly receives the wireless profile from the object apparatus. Further, for example, in the case where the mode selected in S14 of FIG. 2 is the PBC mode, the printer 10 and the object apparatus convert the specific data into a hash code by using a predetermined PIN code, and determine whether the two hash codes are matching. In a case where the two hash codes are matching, the communication executing unit 44 wirelessly receives the wireless profile from the object apparatus. Consequently, the printer 10 and the abject apparatus can use the same wireless profile.

Next, in S54, the communication executing unit 44 executes a connection process with the object apparatus by using the wireless profile, as in S48. Consequently, a wireless connection is established between the printer 10 and the object apparatus. Thereby, a wireless network that includes the printer 10 and the object apparatus is constructed. When S54 ends, the PIN/PBC connection process ends.

For example, in a case where the printer 10 is in the G/O state, it becomes possible for the printer 10 to communicate object data (printing data, etc.) of a communication object with the object apparatus which is in the client state. Moreover, the object data includes the data of a network layer, which is a layer higher than the physical layer of the OSI reference model. Consequently, the printer 10 that is in the G/O state can wirelessly communicate the network layer with the object apparatus that is in the client state. Further, it becomes possible for the printer 10 that is in the G/O state to relay wireless communication between the object apparatus which is in the client state and another apparatus which is registered in the administration list and is in the client state.

Figure 4:
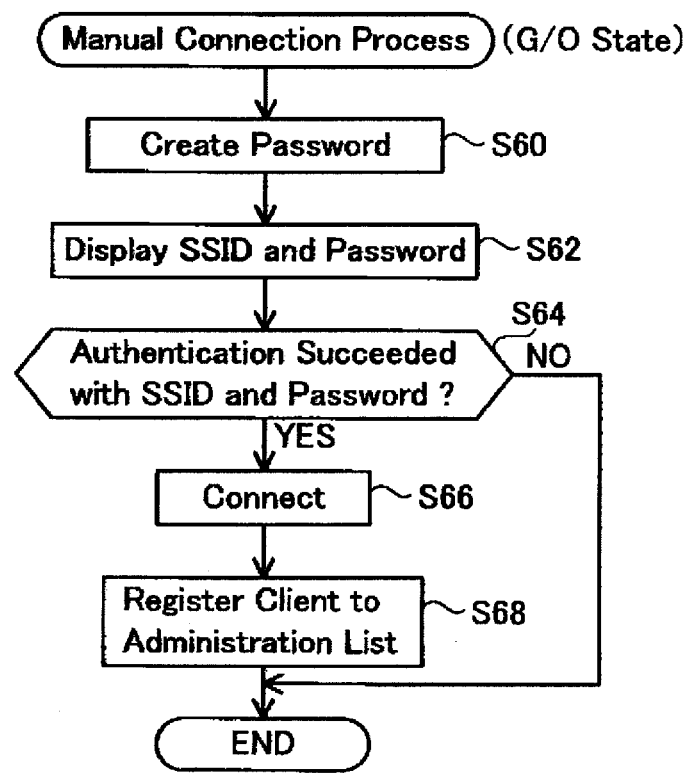
FIG. 4 shows a flowchart of a manual connection process.

(Manual Connection Process: FIG. 4)

Next, the contents of the manual connection process (S28 of FIG. 2) executed by the printer 10 that is in the G/O state will be described with reference to FIG. 4. In a case where the user wishes to establish a wireless connection between the printer 10 and another apparatus (called "object apparatus" below) without using the WPS wireless connection mode, the user selects the manual mode in S14 of FIG. 2. Consequently, the manual connection process is executed. Moreover, as described above, in the case where the manual connection process is to be started, the state of the printer 10 is the G/O state (S26 of FIG. 2). Because, usually, the manual connection process is executed because a connection is assumed with a WFD non-compliant apparatus that cannot be in the G/O state.

In S60, first, the creating unit 42 creates a password. The process S60 is the same as the process S22 of FIG. 2. When S60 ends, the process proceeds to S62.

In S62, the display controlling unit 48 (see FIG. 1) causes the display unit 12 to display the SSID and the password. Specifically, in S62, the display controlling unit 48 causes the display unit 12 to display the predetermined SSID and the password created in S60. The SSID and the password are information that is to be included in a wireless profile needed to establish a wireless connection. The user can learn the SSID and the password by looking at the display unit 12. In the manual mode, the SSID and the password are not wirelessly sent to the object apparatus.

The user operates the operating unit of the object apparatus to input the SSID and the password displayed in the display unit 12 of the printer 10 into the object apparatus. In this case, the object apparatus wirelessly sends, to the printer 10, the SSID and the password that have been input. At this juncture, together with the SSID and the password that have been input, the object apparatus wirelessly sends the MAC address of the object apparatus to the printer 10.

In S64, the communication executing unit 44 determines whether authentication of the SSID and the password received from the object apparatus has succeeded. Specifically, in S64, the communication executing unit 44 determines (authenticates) whether the SSID and the password received from the object apparatus and the SSID and the password displayed in the display unit 12 are matching. In a case of YES in S64 (in a case where the SSID and the password received from the object apparatus and the SSID and the password displayed in the display unit 12 are matching), the process proceeds to S66. Moreover, in a case of NO in S64, the manual connection process ends without S66 and S68 being executed.

In S66, the communication executing unit 44 executes a connection process with the object apparatus using the wireless profile. Specifically, first, in S66 the communication executing unit 44 wirelessly sends a predetermined authentication mode, encryption mode, etc. to the object apparatus. Consequently, the printer 10 and the object apparatus can use a common wireless profile (an SSID, an authentication mode, an encryption mode, a password, etc.). Further, the communication executing unit 44 executes wireless communication with the object apparatus (an Authentication Request, an Authentication Response, an Association Request, an Association Response and a 4way handshake) using the wireless profile, executing various authentication processes other than SSID and password authentication, for example authentication mode and encryption mode authentication, etc. In a case where all the authentications succeed, a wireless connection is established between the printer 10 and the object apparatus. Thereby, a wireless network that includes the printer 10 and the object apparatus is constructed.

Next, in S68, the controller 22 registers the MAC address of the object apparatus, which is in the client state, in the administration list 36 within the memory 32. When S68 ends, the manual connection process ends.

As described above, in the manual mode (see FIG. 4), the user must input the SSID and the password into the object apparatus. Consequently, the manual mode can be called a "manual wireless setting mode". By contrast, in the PIN code mode and the PBC mode (see FIG. 3), the user does not need to input the SSID and the password into the object apparatus. Consequently, the PIN code mode and the PBC mode can together be called an "automatic wireless setting mode (or simple wireless setting mode)".

Figure 5:
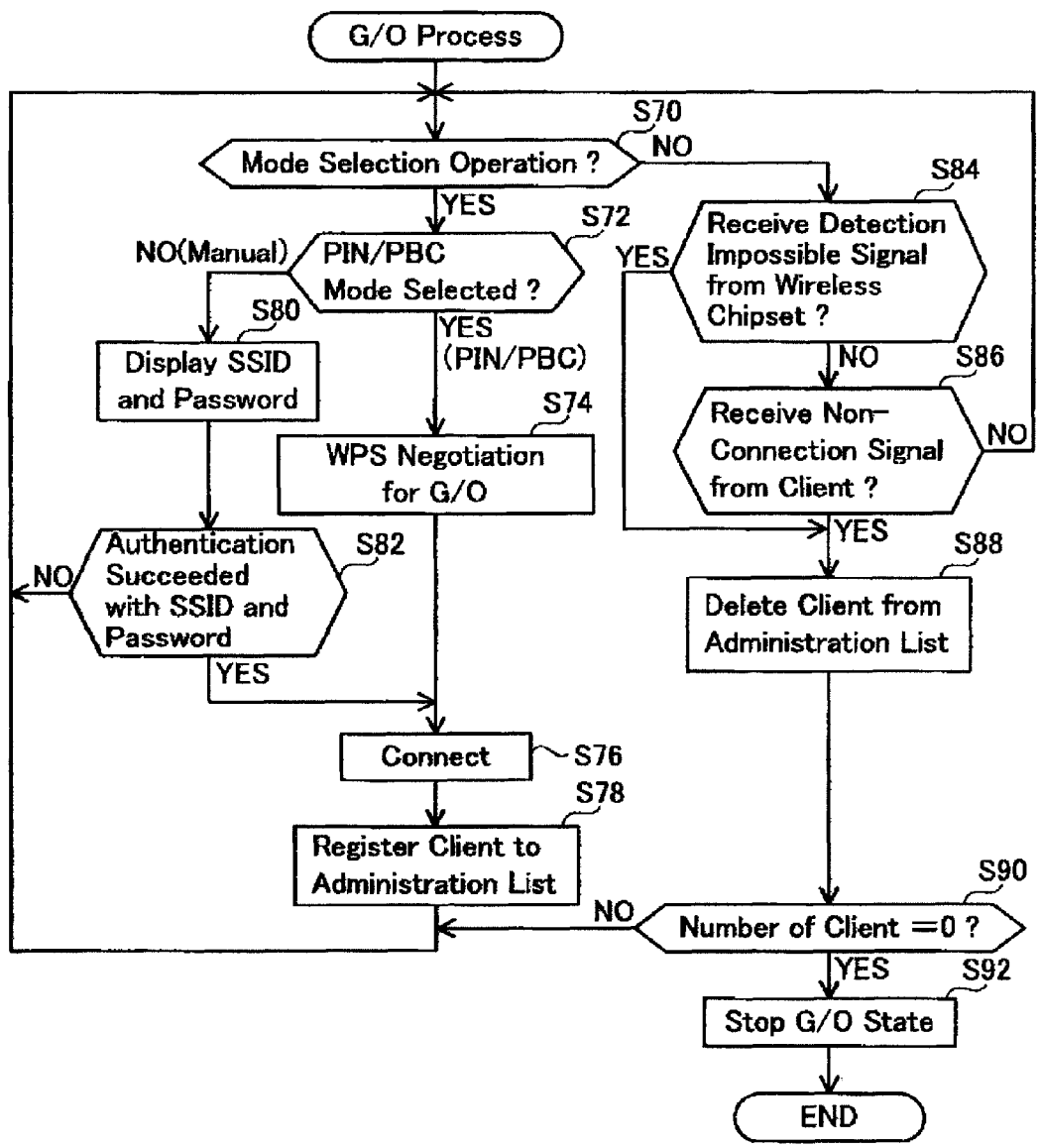
FIG. 5 shows a flowchart of a G/O process.

(G/O Process: FIG. 5)

Next, the contents of a process executed by the printer 10 in a case of operating as the G/O of the wireless network will be described with reference to FIG. 5. In S70, the controller 22 monitors whether the mode selection operation has been executed in the operating unit 14 by the user. If the mode selection operation has been executed (YES in S70), the controller 22 proceeds to S72. Moreover, the user also executes the mode selection operation in an apparatus (called "object apparatus" below) that is to establish a wireless connection with the printer 10 that is in the G/O state.

In S72, the controller 22 determines whether the mode selected in S70 is the PIN code mode or the PBC mode. In a case of YES in S72 (the case where the mode selected in S70=PIN code mode or PBC mode), the controller 22 proceeds to S74. At this juncture, the object apparatus can find the printer 10 in the Scan process, and causes the apparatus list that includes the printer 10 to be displayed in the display unit of the object apparatus.

For example, in a case where the mode selected in S70 is the PIN code mode, when the printer 10 is selected from the apparatus list by the user, the display and input of the PIN code between the object apparatus and the printer 10 is executed as in S40 of FIG. 3, and then the reception of a connection request signal and the sending of an OK signal is executed. On the other hand, for example, in a case where the mode selected in S70 is the PBC mode, the reception of a connection request signal and the sending of an OK signal is executed between the object apparatus and the printer 10 without the display and input of the PIN code being executed. Moreover, the connection request signal received from the object apparatus includes various information such as the MAC address, category, etc. of the object apparatus. Thereby, the controller 22 acquires various information of the object apparatus. Moreover, upon sending the connection request signal to the printer 10, the object apparatus transfers to the client state. This is because the object apparatus cannot assume the G/O state since the printer 10 is in the G/O state. When the object apparatus has transferred to the client state, the controller 22 proceeds to S74.

In S74, the controller 22 executes WPS negotiation for the G/O state, as in S46 of FIG. 3. That is, the process S74 to S78 is the same as S46 to 50 of FIG. 3. When S78 ends, the controller 22 returns to S70.

On the other hand, in a case of NO in S72 (the case when the mode selected in S70=manual mode), the controller 22 proceeds to S80. In S80, the display controlling unit 48 causes the display unit 12 to display the SSID and the password. The password displayed in the display unit 12 in S80 is the password that was created when the printer 10 was transferred to the G/O state (S22 of FIG. 2, S44 of FIG. 3, S60 of FIG. 4). S82 is the same as S64 of FIG. 4. In a case of YES in S82 (in the case where the SSID and the password received from the object apparatus and the SSID and the password displayed in the display unit 12 are matching), the controller 22 continues to S76, and in a case of NO in S82, the controller 22 returns to S70.

On the other hand, in a case of NO in S70 (in a case where the mode selection operation has not been executed), in S84 the controller 22 monitors whether a detection impossible signal is acquired from the wireless chipset 17 (see FIG. 1). An apparatus (called "client apparatus" below) that is in the client state and is registered in the administration list 36 regularly sends a signal (called "regular signal" below) to the printer 10 that is in the G/O state. The wireless chipset 17 receives the regular signal sent by the client apparatus. For example, in a case where the client apparatus is a mobile terminal, the client apparatus may move outside a range in which wireless communication with the printer 10 is possible. Further, e.g., a state may occur in which wireless communication between the printer 10 and the client apparatus cannot be executed due to communication failure, etc. Further, e.g., the power supply of the client apparatus may be turned OFF. In such cases, the wireless chipset 17 cannot receive the regular signal sent from the client apparatus. In a case where the state of being unable to receive the regular signal from the client apparatus continues for a predetermined period, the wireless chipset 17 sends the detection impossible signal to the controller 22. The detection impossible signal includes the MAC address of the client apparatus that is in a detection impossible state. Upon acquiring the detection impossible signal (YES in S84), the controller 22 proceeds to S88.

On the other hand, in a case of NO in S84 (in a case that the detection impossible signal was not acquired from the wireless chipset 17), in S86 the controller 22 monitors whether a non-connection signal is acquired from the client apparatus.

For example, in a case of wanting to make the client apparatus leave the wireless network, the user can execute a predetermined operation in the client apparatus. In this case, the client apparatus wirelessly sends a non-connection signal, which indicates it is leaving the wireless network, to the printer 10 that is in the G/O state. The non-connection signal includes the MAC address of the client apparatus that is the sending source of the non-connection signal. Upon acquiring the non-connection signal (YES in S86), the controller 22 proceeds to S88. Moreover, in a case of NO in S86, the controller 22 returns to S70.

In S88, the controller 22 deletes, from the administration list 36, the MAC address included in the detection impossible signal acquired in S84, or the MAC address included in the non-connection signal acquired in S86. As a result of process S88, the client apparatus leaves the wireless network, and the client apparatus leaves the administration objects of the controller 22. When S88 ends, the controller 22 proceeds to S90.

In S90, the controller 22 determines whether the number of client apparatuses is zero. Specifically, the controller 22 determines whether the number of MAC addresses stored in the administration list 36 is zero. In a case of NO in S90 (in a case where the number of MAC addresses stored in the administration list 36 is equal to or more than 1), the G/O process returns to S70. On the other hand, in a case of YES in S90 (in a case where the number of MAC addresses stored in the administration list is zero), the controller 22 proceeds to S92.

In S92, the stopping unit 46 (see FIG. 1) transfers the state of the printer 10 from the G/O state to the device state, stopping the operation of the printer 10 as the G/O. By stopping operation as the G/O, the printer 10 becomes unable to wirelessly communicate object data (printing data, etc.) with another apparatus. Further, the printer 10 becomes unable to relay the wireless communication of object data with a plurality of client apparatuses. Further, in S92, the stopping unit 46 annuls the wireless profile that was being used in the wireless network. That is, the stopping unit 46 annuls the password that was created when the printer 10 was transferred to the G/O state (S22 of FIG. 2, S44 of FIG. 3, S60 of FIG. 4). That is, in S92, the wireless network disappears. When S92 ends, the G/O process ends.

Figure 6:
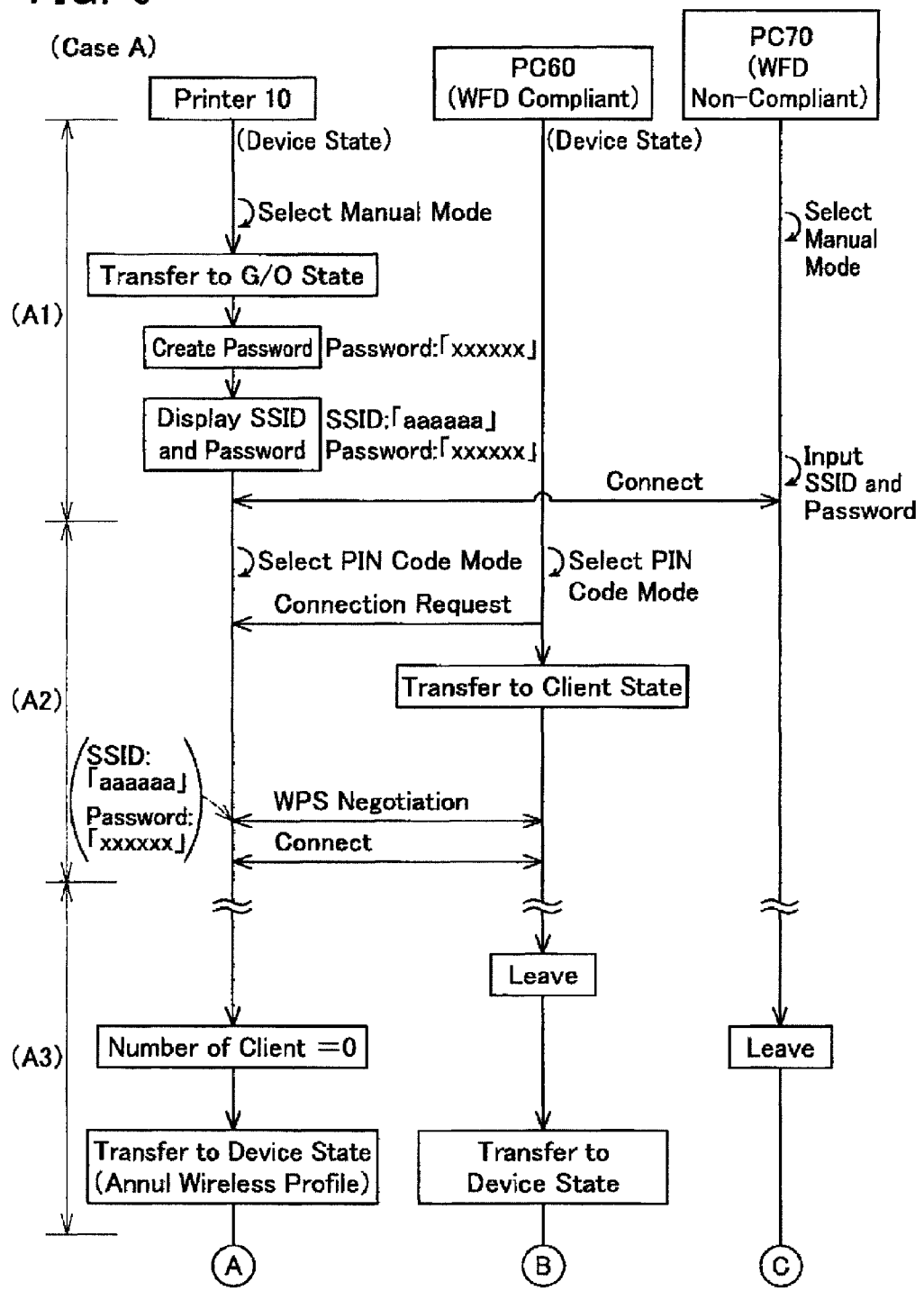
FIG. 6 shows a sequence view of a case A.
Figure 7:
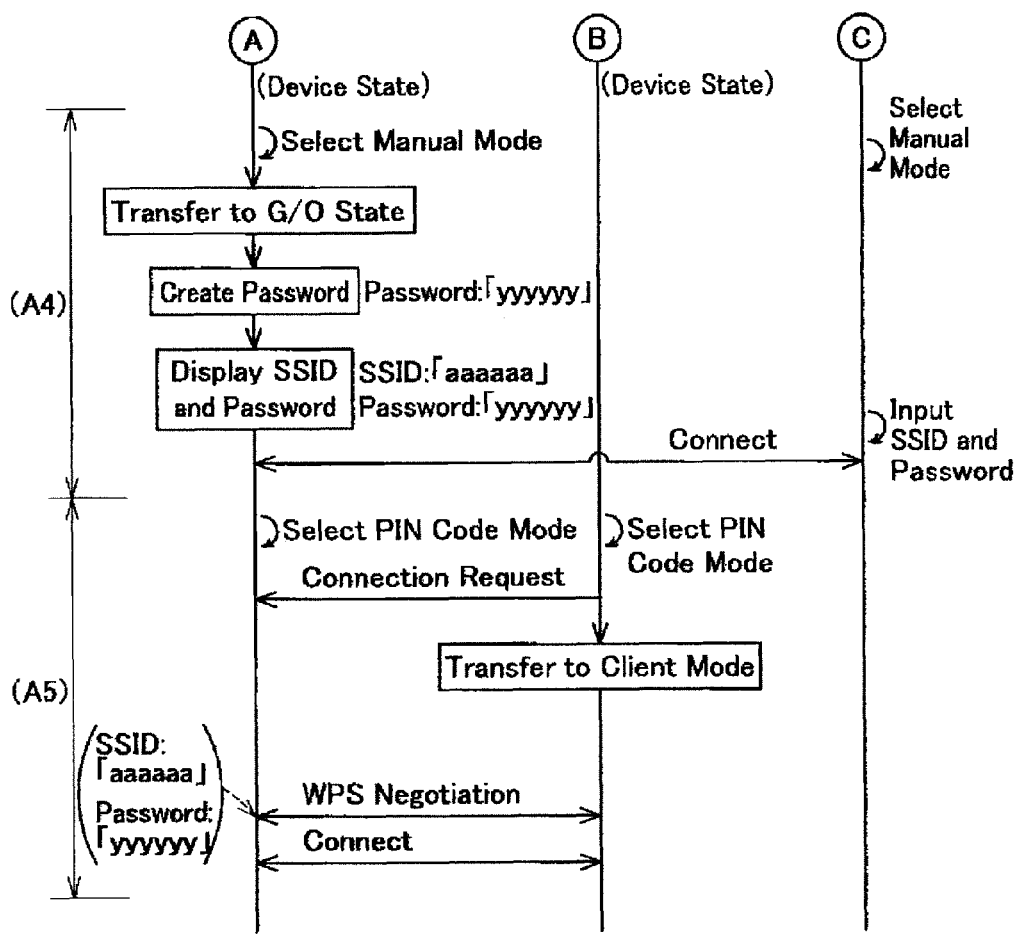
FIG. 7 shows a continuation of the sequence view of FIG. 6.

(Case A: FIG. 6, FIG. 7)

Next, an example for the case that the above processes (see FIGS. 2 to 5) are executed (Case A) will be described with reference to FIG. 6 and FIG. 7.

(Process A1)

In case A, first, the user operates the operating unit 14 of the printer 10, which is in the device state, to execute the mode selection operation to select the manual mode (NO in S16 of FIG. 2). Further, the user also executes the mode selection operation in the PC 70, which is in the device state, to select the manual mode. In this case, first, the printer 10 transfers the state of the printer 10 from the device state to the G/O state (S26 of FIG. 2). Next, the printer 10 creates a password "xxxxxx" (S60 of FIG. 4). Next, the printer 10 causes the display unit 12 to display a predetermined SSID "aaaaaa" and the password "xxxxxx" that was created (S62 of FIG. 4). The user inputs the SSID and the password displayed in the display unit 12 of the printer 10 into the PC 70. The PC 70 wirelessly sends the SSID and the password that were input to the printer 10. If the authentication of the SSID and the password received from the PC 70 succeeds (YES in S64 of FIG. 4), the printer 10 executes the authentication mode and encryption mode authentication, etc. and other authentication. If all the authentication succeeds, a wireless connection is established between the printer 10 and the PC 70 (S66 of FIG. 4). Thereby, a wireless network that includes the printer 10 and the PC 70 is constructed.

(Process A2)

Next, the user executes a mode selection process for selecting the PIN code mode for each of the printer 10 that is in the G/O state and the PC 60 that is in the device state (YES in S70, YES in S72 of FIG. 5). In this case, the PC 60 can find the printer 10 in the Scan process, and causes the apparatus list that includes the printer 10 to be displayed in a display unit of the PC 60. When the printer 10 has been selected from the apparatus list by the user, the display and input of the PIN code is executed in the PC 60 and the printer 10. Then, the PC 60 transfers to the client state. Next, WPS negotiation is executed between the printer 10 and the PC 60 (S74 of FIG. 5), and the wireless profile is sent from the printer 10 to the PC 60. This wireless profile includes the SSID "aaaaaa" and the password "xxxxxx" that was created. Next, the printer 10 executes a connection process with the PC 60 using the wireless profile (S76 of FIG. 5). Consequently, a wireless connection between the printer 10 and the PC 60 is established (S76, S78 of FIG. 5). Thereby, the PC 60 can newly participate in an existing wireless network that includes the printer 10 and the PC 70.

(Process A3)

Then, the PC 60 and the PC 70 leave the wireless network. Moreover, the state of the PC 60 transfers from the client state to the device state. Consequently, the number of client apparatuses (i.e., the client number) that are administration objects of the printer 10 becomes zero (YES in S90 of FIG. 5). In this case, the printer 10 transfers (returns) the state of the printer 10 from the G/O state to the device state, stopping operation as the G/O (S92 of FIG. 5). At this juncture, the printer 10 annuls the wireless profile that was being used in the wireless network. Thereby, the wireless network disappears. According to this configuration, the printer 10 can cause the wireless network to disappear appropriately.

(Process A4)

As shown in FIG. 7, next the user re-executes the mode selection operation to select the manual mode for each of the printer 10 that is in the device state and the PC 70 that is in the device state (NO in S16 of FIG. 2). In this case, as in process A1, first the printer 10 transfers the state of the printer 10 from the device state to the G/O state (S26 of FIG. 2). Next, the printer 10 creates, in a random manner, a password "yyyyyy" which is different from the password "xxxxxx" created previously (S60 of FIG. 4). Consequently, even if "xxxxxx" were illegally acquired by a third party, the third party would not readily be able to guess "yyyyyy" on the basis of "xxxxxx". Thereby, the security of the wireless network can be improved. Next, the printer 10 causes the display unit 12 to display the predetermined SSID "aaaaaa" and the password "yyyyyy" that has been created (S62 of FIG. 4). From this point on, the same processes are executed between the printer 10 and the PC 70 as in process A1 described above. Consequently, a wireless connection is re-established between the printer 10 and the PC 70 (S66 of FIG. 4). Thereby, a new wireless network that includes the printer 10 and the PC 70 is constructed.

(Process A5)

Next, the user executes the mode selection process to select the PIN code mode for each of the printer 10 that is in the G/O state and the PC 60 that is in the device state (YES in S70, YES in S72 of FIG. 5). In this case, also, the same process is executed between the printer 10 and the PC 60 as in process A2 described above. However, as shown in FIG. 7, in process A5 the wireless profile sent from the printer 10 to the PC 60 in the WPS negotiation includes not the password "xxxxxx", but the password "yyyyyy". This point differs from the process A2 described above. As a result of the process A5, a wireless connection is established between the printer 10 and the PC 60 (S76, S78 of FIG. 5). Thereby, the PC 60 can newly participate in an existing wireless network that includes the printer 10 and the PC 70.

For example, in case A, when the wireless network is constructed in the process A1 of FIG. 6, the password "xxxxxx" displayed in the display unit 12 could be intercepted by a third party. In the present embodiment, in the case where the printer 10 is to construct a wireless network in the process A4 of FIG. 7 after the wireless network constructed in the process A1 of FIG. 6 has disappeared, the printer 10 creates the different password "yyyyyy". That is, in a case where a new wireless network is to be constructed, the printer 10 creates a new password that the third party cannot know. Consequently, it is possible to suppress illegal participation of an apparatus owned by the third party in the new wireless network. That is, the security of the new wireless network can be improved, and consequently the new wireless network can be constructed appropriately.

Figure 8:
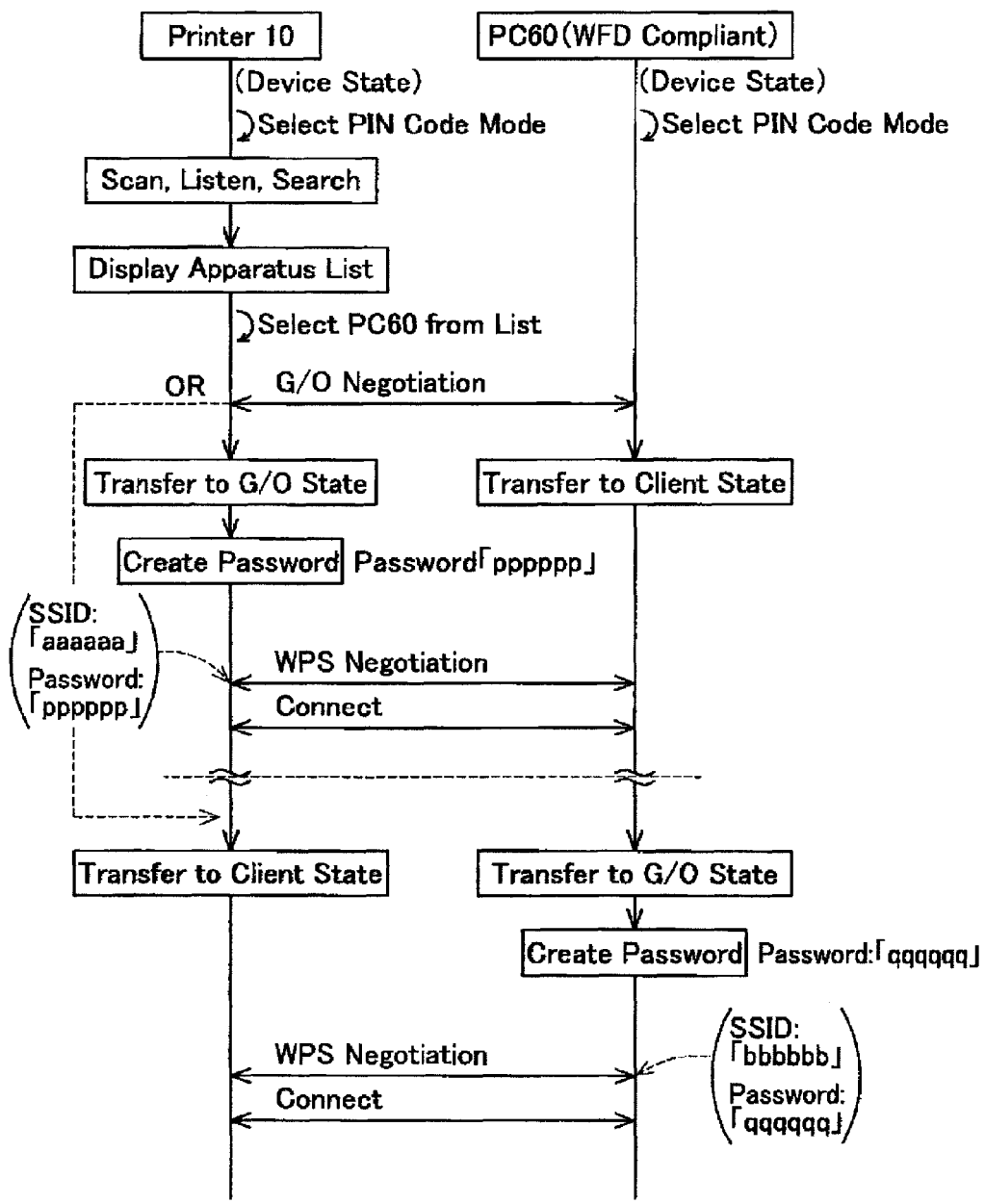
FIG. 8 shows a sequence view of a case B.

(Case B: FIG. 8)

Next, another example for the case that the above processes (see FIGS. 2 to 5) are executed (Case B) will be described with reference to FIG. 8. In FIG. 8, a situation is assumed of establishing a wireless connection between the printer 10 and the PC 60 by means of the PIN code mode.

In case B, first, the user executes the mode selection operation to select the PIN code mode for each of the printer 10 that is in the device state and the PC 60 that is in the device state (YES in S16 of FIG. 2). In this case, first, the printer 10 executes the Scan, Listen, and Search processes (S30 to S34 of FIG. 3). At this juncture, in the Search process, the printer 10 can find the PC 60 that is in the device state. Next, the printer 10 causes the display unit 12 to display an apparatus list that includes the PC 60 (S36 of FIG. 3). The user can operate the operating unit 14 of the printer 10 to execute the apparatus selection operation to select the PC 60. When the apparatus selection operation has been executed, the display and input of the PIN code between the printer 10 and the PC 60 is executed.

Next, the printer 10 executes G/O negotiation with the PC 60 (S40 of FIG. 3). For example, in a case where the printer 10 is determined as the G/O and the PC 60 is determined as the client as a result of the G/O negotiation (YES in S42 of FIG. 3), the printer 10 transfers the state of the printer 10 to the G/O state. On the other hand, the PC 60 transfers the state of the PC 60 to the client state. Next, the printer 10 creates a password "ppppp" (S44 of FIG. 3). Next, WPS negotiation is executed between the printer 10 and the PC 60 (S46 of FIG. 3), and a wireless profile is sent from the printer 10 to the PC 60. This wireless profile includes the predetermined SSID "aaaaaa" and the password "ppppp". Next, the printer 10 executes a connection process with the PC 60 using the wireless profile (S48 of FIG. 3). Consequently, a wireless connection is established between the printer 10 and the PC 60 (S48, S50 of FIG. 3). Thereby, a wireless network that includes the printer 10 and the PC 60 is constructed.

Further, in a case where the printer 10 is determined as the client and the PC 60 is determined as the G/O as a result of the G/O negotiation (NO in S42 of FIG. 3), the printer 10 transfers the state of the printer 10 to the client state. On the other hand, the PC 60 transfers the state of the PC 60 to the G/O state. In this case, the printer 10 (i.e., the creating unit 42) does not create a password. The PC 60 creates a password "qqqqqq". Next, WPS negotiation is executed between the printer 10 and the PC 60 (S52 of FIG. 3), and a wireless profile is sent from the PC 60 to the printer 10. This wireless profile includes a predetermined SSID "bbbbbb" and the password "qqqqqq". Next, the printer 10 executes a connection process with the PC 60 using the wireless profile (S54 of FIG. 3). Consequently, a wireless connection is established between the printer 10 and the PC 60 (S54 of FIG. 3). Thereby, a wireless network that includes the printer 10 and the PC 60 is constructed. Moreover, here, an example is described in which the PC 60 newly creates the password "qqqqqq". However, the PC 60 may use a predetermined password and not create a password.

In case B, the printer 10 can execute operations appropriately in accordance with which state, of the G/O state and the client state, it has been determined the printer 10 should operate in. Consequently, the wireless network can be constructed appropriately.

(Corresponding Relationships)

The printer 10 is an example of the "wireless communication device". The GM state and the client state are respectively examples of the "parent state" and the "child state". The PC 60 in case A (FIG. 6, FIG. 7) is an example of the "first external device" and the "second external device". The PC 70 in case A is an example of the "third external device". The wireless network constructed in the process A1 and the wireless network constructed in the process A4 of case A are respectively examples of the "first wireless network" and the "second wireless network". The password (xxxxxx) created in the process A1 and the password (yyyyyy) created in the process A4 of case A are respectively examples of the "first authentication information" and the "second authentication information". The wireless profile that includes the password "xxxxx" and the wireless profile that includes the password "yyyyyy" are respectively examples of the "first wireless profile" and the "second wireless profile". The PIN/PBC mode and the manual mode are respectively examples of the "automatic wireless setting mode" and the "manual wireless setting mode". The password "qqqqqq" and the wireless profile that includes the password "qqqqqq" of case B (FIG. 8) are respectively examples of the "specific authentication information" and the "specific wireless profile".

Variants of the foregoing embodiment are listed below.

(1) In the foregoing embodiment, the creating unit 42 creates only the password, and does not create the SSID (S22 of FIG. 2, S44 of FIG. 3, S60 of FIG. 5). Instead, the creating unit 42 may create both the password and the SSID. Further, the creating unit 42 may create only the SSID, and not the password. Generally speaking, the creating unit may create not only the first and second authentication information, but also other information (e.g., the SSID).

(2) In the foregoing embodiment, the creating unit 42 created the password by converting a character string that was created in a random manner using a predetermined function related to the current time. Instead, the creating unit 42 may use a character string that was created in a random manner as the password. Further, the creating unit 42 may create the password following a predetermined rule rather than in a random manner. Generally speaking, the creating unit may create any second authentication information that is different from the first authentication information.

(3) The "wireless communication device" is not restricted to the printer 10, but may be another apparatus capable of wireless communication (e.g., a mobile phone, PDA, PC, server, FAX device, copier, scanner, multi-function device, etc.).

(4) In the foregoing embodiment, it is not specified whether the WFD non-compliant apparatus (the PC 70) is capable or incapable of executing WPS negotiation. The WFD non-compliant apparatus may be capable of executing WPS negotiation (called "WPS compliant apparatus" below), or may be incapable of executing WPS negotiation (called "WPS non-compliant apparatus" below). That is, the first to third external devices may be a WFD compliant apparatus, a WPS compliant apparatus within a WFD non-compliant apparatus, or a WPS non-compliant apparatus within a WFD non-compliant apparatus.

(5) In S62 of FIG. 4 and S80 of FIG. 5, the display controlling unit 48 may cause the SSID and the password to be displayed not in the display unit 12 of the printer 10, but instead in a display unit of another apparatus. That is, generally speaking, the "display unit" may be a display unit inside the wireless communication device, or may be a display unit outside the wireless communication device.

(6) The "parent state" is not restricted to the WFD G/O state, but may be any state that manages other devices constituting the wireless network (e.g., manages a list of information relating to another device, relays wireless communication of another device, etc.). Further, the "child state" is not restricted to the WFD client state, but may be any state managed by a parent state apparatus.

(7) In the foregoing embodiment, the CPU 30 of the printer 10 realizes the units 40 to 48 by executing processes according to software. Instead, at least one of the units 40 to 48 may be realized by a hardware resource such as a logic circuit.

(8) In the foregoing embodiment, the determination unit 40, the creating unit 42, the communication executing unit 44, the stopping unit 46, and the display controlling unit 48 are realized as a result of the controller 22 executing the processes according to the program 34 in the memory 32. Nevertheless, at least one unit of respective units 40 to 48 may alternately be realized by a hardware resource such as a logic circuit.

What is claimed is:

1. A wireless communication device configured to be capable of operating selectively in any state among a plurality of states including a parent state performing as a parent station of a wireless network and a child state performing as a child station of the wireless network, the wireless communication device comprising:
one or more processors; and
a memory that stores a computer program including instructions executed by the one or more processors,
wherein the instructions cause the one or more processors, when executed by the one or more processors, to function as:
a determination unit configured to determine a state among the plurality of states in which the wireless communication device is to operate;
a creating unit configured to create first authentication information included in a first wireless profile for constructing a first wireless network, in a case where the first wireless network including the wireless communication device and a first external device is to be constructed, and it is determined that the wireless communication device is to operate in the parent state; and
a communication executing unit configured to construct the first wireless network by executing a communication for establishing a wireless connection with the first external device by using the first wireless profile including the first authentication information,
wherein in a case where a second wireless network including the wireless communication device and a second external device is to be constructed after the first wireless network has disappeared, and it is determined that the wireless communication device is to operate in the parent state:
the creating unit is further configured to create second authentication information included in a second wireless profile for constructing the second wireless network, the second authentication information being different from the first authentication information; and
the communication executing unit is further configured to construct the second wireless network by executing a communication for establishing a wireless connection with the second external device by using the second wireless profile including the second authentication information.

2. The wireless communication device as in claim 1, wherein
in a case where the second wireless network is to be constructed, and it is determined that the wireless communication device is to operate in the child state:
the creating unit is configured not to create the second authentication information; and
the communication executing unit is configured to construct the second wireless network by executing a communication for establishing a wireless connection with the second external device by using a specific wireless profile including specific authentication information that the second external device has.

3. The wireless communication device as in claim 1, wherein
the determination unit is configured to:
determine selectively in which state, between the parent state and the child state, the wireless communication device is to operate, in a case where the second wireless network is to be constructed according to an automatic wireless setting mode; and
determine that the wireless communication device is to operate in the parent state in a case where the second wireless network is to be constructed according to a manual wireless setting mode.

4. The wireless communication device as in claim 1, wherein the instructions cause the one or more processors, when executed by the one or more processors, to further function as:
a stopping unit configured to stop the wireless communication device from operating in the parent state so as to cause the first wireless network to disappear in a case where a number of external devices operating in the child state included in the first wireless network becomes zero.

5. The wireless communication device as in claim 1, wherein the instructions cause the one or more processors, when executed by the one or more processors, to further function as:
a display controlling unit configured to cause a display unit to display the first authentication information in a case where the first authentication information is created, and cause the display unit to display the second information in a case where the second information is created.

6. The wireless communication device as in claim 1, wherein
the communication executing unit is further configured to execute a communication for establishing a wireless connection with a third external device by using the second wireless profile including the second authentication information in a case where the third external device is to newly participate in the second wireless network.

7. The wireless communication device as in claim 1, wherein
the creating unit is configured to create a first character string in a random manner so as to create the first authentication information by using the first character string, and create a second character string that is different from the first character string in a random manner so as to create the second authentication information by using the second character string.

8. A wireless communication device configured to be capable of operating selectively in any state among a plurality of states including a parent state performing as a parent station of a wireless network and a child state performing as a child station of the wireless network, the wireless communication device comprising:
a determination unit configured to determine a state among the plurality of states in which the wireless communication device is to operate;
a creating unit configured to create first authentication information included in a first wireless profile for constructing a first wireless network, in a case where the first wireless network including the wireless communication device and a first external device is to be constructed, and it is determined that the wireless communication device is to operate in the parent state; and
a communication executing unit configured to construct the first wireless network by executing a communication for establishing a wireless connection with the first external device by using the first wireless profile including the first authentication information,
wherein in a case where a second wireless network including the wireless communication device and a second external device is to be constructed after the first wireless network has disappeared, and it is determined that the wireless communication device is to operate in the parent state:
the creating unit is further configured to create second authentication information included in a second wireless profile for constructing the second wireless network, the second authentication information being different from the first authentication information; and
the communication executing unit is further configured to construct the second wireless network by executing a communication for establishing a wireless connection with the second external device by using the second wireless profile including the second authentication information.

9. A non-transitory computer-readable storage medium storing a computer program for a wireless communication device configured to be capable of operating selectively in any state among a plurality of states including a parent state performing as a parent station of a wireless network and a child state performing as a child station of the wireless network,
the computer program including instructions for causing one or more processors of the wireless communication device to perform:
determining a state among the plurality of states in which the wireless communication device is to operate;
creating first authentication information included in a first wireless profile for constructing a first wireless network in a case where the first wireless network including the wireless communication device and a first external device is to be constructed, and it is determined that the wireless communication device is to operate in the parent state;
constructing the first wireless network by executing a communication for establishing a wireless connection with the first external device by using the first wireless profile including the first authentication information;
creating second authentication information included in a second wireless profile for constructing a second wireless network, the second authentication information being different from the first authentication information, in a case where the second wireless network including the wireless communication device and a second external device is be constructed after the first wireless network has disappeared, and it is determined that the wireless communication device is to operate in the parent state; and
constructing the second wireless network by executing a communication for establishing a wireless connection with the second external device by using the second wireless profile including the second authentication information.

* * * * *